United States Patent
Peng et al.

(10) Patent No.: US 11,145,238 B2
(45) Date of Patent: Oct. 12, 2021

(54) METHOD FOR CONTROLLING IMAGE GRAPHING OF TERMINAL, NONTRANSITORY COMPUTER-READABLE STORAGE MEDIUM, AND TERMINAL

(71) Applicant: Guangdong Oppo Mobile Telecommunications Corp., Ltd., Guangdong (CN)

(72) Inventors: Deliang Peng, Guangdong (CN); Yongpeng Yi, Guangdong (CN); Shengjun Gou, Guangdong (CN); Xiaori Yuan, Guangdong (CN); Gaoting Gan, Guangdong (CN); Zhiyong Zheng, Guangdong (CN); Hai Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/565,988

(22) Filed: Sep. 10, 2019

(65) Prior Publication Data

US 2020/0005702 A1 Jan. 2, 2020

Related U.S. Application Data

(63) Continuation of application No. PCT/CN2017/107371, filed on Oct. 23, 2017.

(30) Foreign Application Priority Data

Mar. 10, 2017 (CN) .......................... 201710142968.1

(51) Int. Cl.
*G09G 3/20* (2006.01)
*G06F 3/0488* (2013.01)
*G09G 5/00* (2006.01)

(52) U.S. Cl.
CPC ....... *G09G 3/2092* (2013.01); *G06F 3/04883* (2013.01); *G09G 5/003* (2013.01); *G09G 2330/021* (2013.01)

(58) Field of Classification Search
CPC ................. G09G 3/2092; G09G 5/003; G09G 2330/021; G06F 3/04883
See application file for complete search history.

(56) References Cited

U.S. PATENT DOCUMENTS 9,355,585 B2 * 5/2016 Tripathi .................. G06F 3/041
2008/0055318 A1 3/2008 Glen
(Continued)

FOREIGN PATENT DOCUMENTS

| CN | 101159862 A | 4/2008 |
|---|---|---|
| CN | 101589420 A | 11/2009 |

(Continued)

OTHER PUBLICATIONS

Partial supplementary European search report issued in corresponding European application No. 17899267.3 dated Nov. 8, 2019.
(Continued)

*Primary Examiner* — Samantha (Yuehan) Wang
(74) *Attorney, Agent, or Firm* — Young Basile Hanlon & MacFarlane, P.C.

(57) ABSTRACT

A terminal, a method for controlling image graphing of the terminal, and a non-transitory computer-readable storage medium are provided. The method includes: initiating an image graphing request, and detecting response information of the image graphing request; determining, according to a preset image graphing strategy, whether a target object meets a non-graphing condition, when the response information of the image graphing request is received; skipping an image graphing operation to the target object when the target object meets the non-graphing condition.

20 Claims, 8 Drawing Sheets

(56) References Cited

U.S. PATENT DOCUMENTS

| | | | | |
|---|---|---|---|---|
| 2013/0050253 | A1* | 2/2013 | Jooste | G06F 16/51 345/629 |
| 2014/0354664 | A1* | 12/2014 | Brown | G09G 5/363 345/545 |
| 2016/0021384 | A1 | 1/2016 | Croxford et al. | |
| 2016/0148335 | A1 | 5/2016 | Huang et al. | |

FOREIGN PATENT DOCUMENTS

| | | |
|---|---|---|
| CN | 102063695 A | 5/2011 |
| CN | 104503564 A | 4/2015 |
| CN | 105122346 A | 12/2015 |
| CN | 105741819 A | 7/2016 |
| CN | 105867576 A | 8/2016 |

OTHER PUBLICATIONS

International search report issued in corresponding international application No. PCT/CN2017/107371 dated Dec. 20, 2017.
Extended European search report issued in corresponding European application No. 17899267.3 dated Feb. 11, 2020.
The first OA and English Translation issued in corresponding CN application No. 201710142968.1 dated Mar. 1, 2019.
The second OA and English Translation issued in corresponding CN application No. 201710142968.1 dated Jul. 5, 2019.
Communication pursuant to Article 94(3) EPC for EP Application 17899267.3 dated Jul. 1, 2021. (7 pages).
Indian Examination Report for IN Application 201917037480 dated Apr. 26, 2021. (5 pages).

* cited by examiner

METHOD FOR CONTROLLING IMAGE GRAPHING OF TERMINAL, NONTRANSITORY COMPUTER-READABLE STORAGE MEDIUM, AND TERMINAL

CROSS-REFERENCE TO RELATED APPLICATION(S)

This application is a continuation of International Application No. PCT/CN2017/107371, filed on Oct. 23, 2017, which claims priority to and the benefit of Chinese Patent Application No. 201710142968.1, filed on Mar. 10, 2017, the entire disclosure of both of which are hereby incorporated by reference in their entireties.

TECHNICAL FIELD

The present disclosure relates to the technology field of terminals, and more particularly to a method for controlling image graphing of a terminal, a non-transitory computer-readable storage medium, and a terminal.

BACKGROUND

With the development of mobile terminal technology, a variety of mobile terminals have become indispensable tools in people's lives and work. In mobile terminals with operating systems, the mobile terminals present various display interfaces of different moments by continuously refreshing the display interface.

The display refresh processes in mobile terminals such as mobile phones mainly include an image graphing operation, an image synthesizing operation, and a display operation. However, the mobile terminals in related arts have some defects, such as high power consumption, etc., in the process of image graphing, which need to be improved.

SUMMARY

Implementations of the present disclosure provide a method for controlling image graphing of a terminal, a non-transitory computer-readable storage medium, and a terminal.

In a first aspect, an implementation of the present disclosure provides a method for controlling image graphing of a terminal. The method includes the following. An image graphing request is initiated, and response information of the image graphing request is detected. When the response information of the image graphing request is received, whether a target object meets a non-graphing condition is determined according to a preset image graphing strategy, where the target object includes one of a current application and layers of the current application. If the target object meets the non-graphing condition, an image graphing operation to the target object is skipped.

In a second aspect, an implementation of the present disclosure further provides a non-transitory computer-readable storage medium. The non-transitory computer-readable storage medium is configured to store computer programs which, when executed by a processor, cause the processor to: initiate an image graphing request, and detect response information of the image graphing request; determine, according to a preset image graphing strategy, whether a target object meets a non-graphing condition, when the response information of the image graphing request is received, where the target object includes one of a current application and layers of the current application; and skip an image graphing operation to the target object in response to a determination that the target object meets the non-graphing condition.

In a third aspect, an implementation of the present disclosure provides a terminal, which includes at least one processor and a computer readable storage coupled to the at least one processor. The computer readable storage stores computer programs thereon, which when executed by the processor, cause the processor to perform the following actions. An image graphing request is initiated, and response information of the image graphing request is detected. When the response information of the image graphing request is received, whether a target object meets a non-graphing condition is determined according to a preset image graphing strategy, where the target object includes one of a current application and layers of the current application. If the target object meets the non-graphing condition, an image graphing operation to the target object is skipped.

BRIEF DESCRIPTION OF THE DRAWINGS

To describe technical solutions in the implementations of the present disclosure or of the related art more clearly, the following briefly introduces the accompanying drawings required for describing the implementations of the present disclosure or the related art. Apparently, the accompanying drawings in the following description only illustrate some implementations of the present disclosure. Those of ordinary skill in the art may also obtain other drawings based on these accompanying drawings without creative efforts.

DETAILED DESCRIPTION

Figure 1:
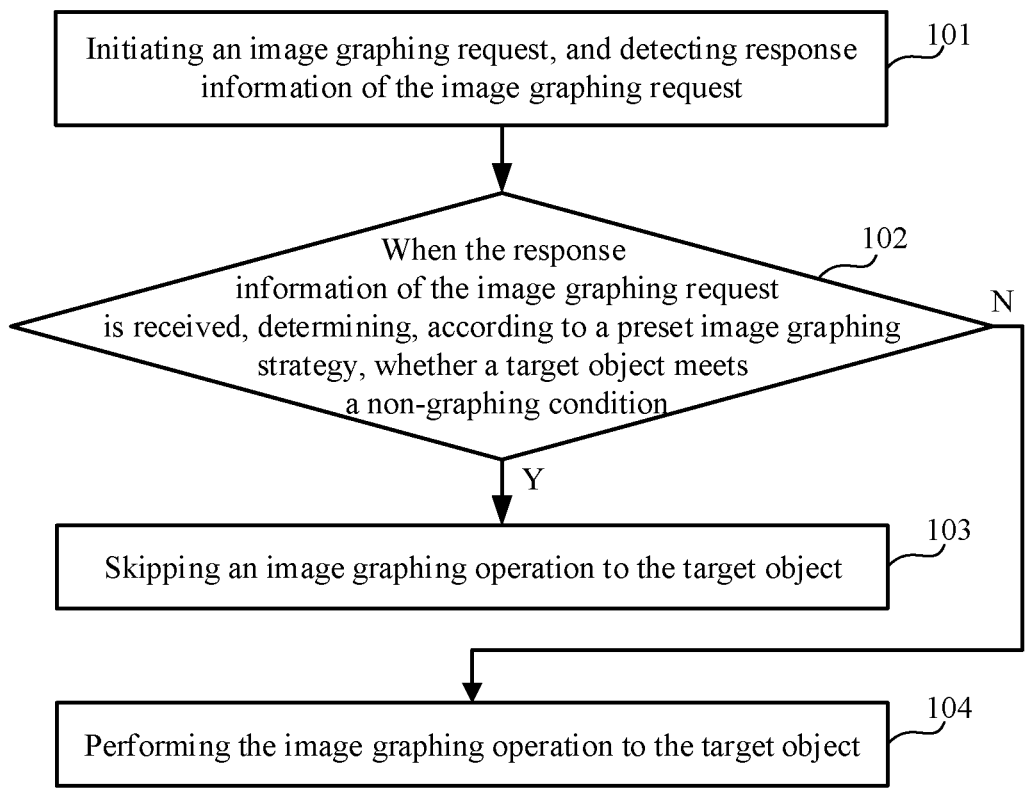
FIG. 1 is a flowchart of a method for controlling image graphing of a terminal according to an implementation of the present disclosure.

In order to make the objects, technical solutions and advantages of the present disclosure more clear, the specific implementations of the present disclosure will be further described in detail below with reference to the accompanying drawings. It should be understood that the specific implementations described herein are merely illustrative of the present disclosure, rather than being intended to limit the present disclosure. It should also be noted that, for ease of description, only part, not all, of the contents related to the present disclosure are shown in the drawings. Before discussing the exemplary implementations in more detail, it should be noted that some exemplary implementations are described as processes or methods depicted as flowcharts. Although the flowcharts describe various operations (or steps) as a sequential process, many of the operations can be implemented in parallel, concurrently or concurrently. In addition, the order of operations can be rearranged. The process may be terminated when its operation is completed, but may also have additional steps not included in the drawings. The processing may correspond to methods, functions, procedures, subroutines, subroutines, and the like.

According to an implementation of the present disclosure, a method for controlling image graphing of a terminal is provided. The method includes the following. An image graphing request is initiated, and response information of the image graphing request is detected. When the response information of the image graphing request is received, whether a target object meets a non-graphing condition is determined according to a preset image graphing strategy, where the target object includes one of a current application and layers of the current application. In response to a determination that the target object meets the non-graphing condition, an image graphing operation to the target object is skipped.

In some implementations, the target object is the current application. The action of determining, according to the preset image graphing strategy, whether the target object meets the non-graphing condition includes the following: determining a difference between a pixel value of a to-be-graphed image of the current application and that of a previous graphed image corresponding to the current application; and determining that the current application meets the non-graphing condition, in response to a determination that the difference is less than a first preset value.

The action of skipping the image graphing operation to the target object includes: skipping the image graphing operation to the current application.

In some implementations, the target object is each of the layers of the current application. The action of determining, according to the preset image graphing strategy, whether the target object meets the non-graphing condition includes: taking each of the layers as a current layer respectively; determining a difference between a pixel value of a to-be-graphed image of the current layer and that of a previous graphed image corresponding to the current layer; and determining that the current layer meets the non-graphing condition, in response to a determination that the difference is less than a second preset value.

The action of skipping the image graphing operation to the target object includes: skipping the image graphing operation to the current layer.

In some implementations, the target object is the current application. The action of determining, according to the preset image rendering strategy, whether the target object satisfies the non-graphing condition includes: acquiring an application attribute of the current application, and determining, according to the application attribute, whether the current application has a corresponding first preset graphing parameter, where the application attribute includes at least one of an application identifier, an application type, and an application priority; determining that the current application meets the non-graphing condition, in response to a determination that the current application has the corresponding first preset graphing parameter and the value of the first preset graphing parameter is a first preset value.

The action of skipping the image graphing operation to the target object includes: skipping the image graphing operation to the current application.

In some implementations, the method further includes one of the following: initializing the value of the first preset graphing parameter, in response to the determination that the current application has the corresponding first preset graphing parameter and the value of the first preset graphing parameter is the first preset value; and increasing the value of the first preset graphing parameter by one, in response to a determination that the current application has the corresponding first preset graphing parameter but the value of the first preset graphing parameter isn't the first preset value.

In some implementations, the target object is each of the layers of the current application. The action of determining, according to the preset image graphing strategy, whether the target object meets the non-graphing condition includes: acquiring a layer attribute of each layer of the current application, and determining, according to the layer attribute of the each layer, that a layer having a corresponding second preset graphing parameter is a target layer, where the layer attribute includes at least one of a layer identifier, a layer type, and a layer priority; and determining that the target layer meets the non-graphing condition, in response to a determination that the value of the second preset graphing parameter corresponding to the target layer is a second preset value.

The action of skipping the image graphing operation to the target object includes: skipping the image graphing operation to the target layer.

In some implementations, the method further includes one of the following: initializing the value of the second preset graphing parameter, in response to the determination that the value of the second preset graphing parameter is the second preset value; and increasing the value of the second preset graphing parameter by one, in response to a determination that the value of the second preset graphing parameter isn't the second preset value.

In some implementations, the method further includes the following: performing the image graphing operation to the target object in response to a determination that the target object does not meet the non-graphing condition.

In some implementations, the action of initiating the image graphing request, and detecting the response information of the image graphing request includes: detecting whether a touch sliding operation of a user acting on a display screen of the terminal is received, when an image graphing event is triggered; initiating the image graphing request based on the touch sliding operation in response to a determination that the touch sliding operation acting on the display screen is received; and detecting the response information of the image graphing request.

FIG. 1 is a flowchart of a method for controlling image graphing of a terminal according to an implementation of the present disclosure. The method of this implementation may be performed by an apparatus for controlling image graphing of the terminal. The apparatus may be implemented by hardware and/or software, and the apparatus may be taken as a part of the terminal and arranged in the interior of the terminal.

The method for controlling image graphing of the terminal provided in this implementation includes the following actions at blocks illustrated in FIG. 1.

At block 101, an image graphing request is initiated, and response information of the image graphing request is detected.

Figure 2:
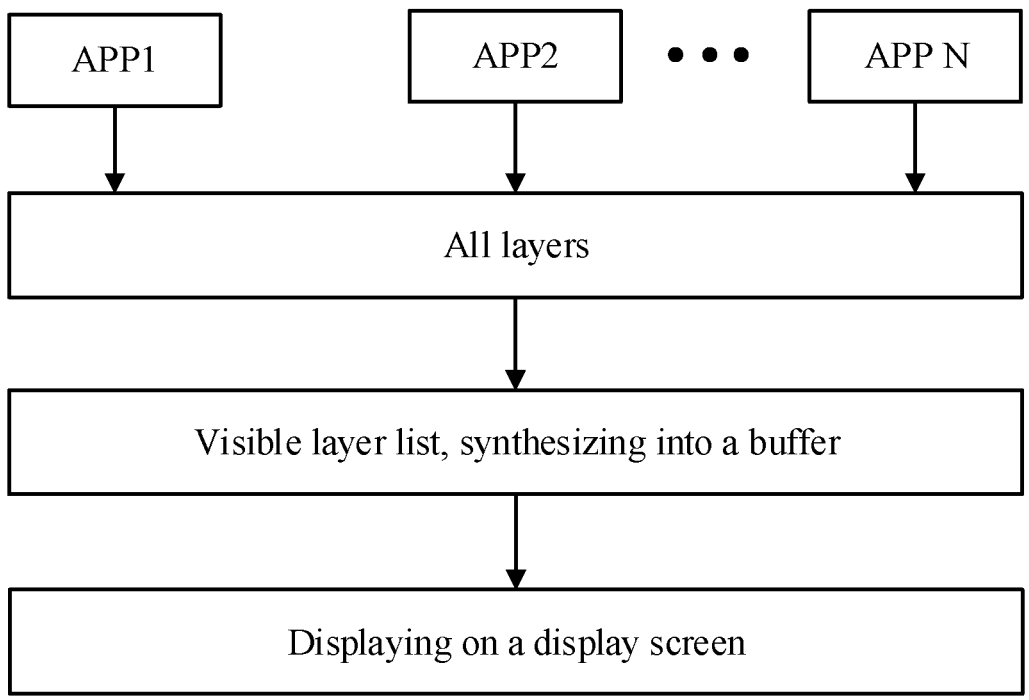
FIG. 2 is a schematic diagram showing a graphing and display process according to an implementation of the present disclosure.

In order to facilitate understanding, an Android system is taken as an example to briefly describe a process from graphing to displaying, of the display image in the Android system. FIG. 2 is a schematic diagram showing a graphing and display process according to an implementation of the present disclosure.

First, in an application layer, each application program (hereinafter referred to as an application or APP) contains one or more image layers, and the applications APP1, APP2 APPN each performs, according to its own application design (usually decided by corresponding installation package APK), layer rendering operations (that is, graphing images on the layers). After the rendering operations are completed, all the layers rendered by each of the applications are sent to a layer synthesizing module (surface flinger) that performs a layer synthesis operation. Graphed images obtained after an APP performs a layer rendering operation may include images of one layer of the APP or images of multiple layers of the APP.

Then, in an application framework layer, all layers (including visible and invisible layers) create a list of layers which is defined as ListAll. The layer synthesizing module selects the visible layers from the ListAll to create a visible layer list which is defined as DisplayList. Then, the layer synthesizing module finds an idle frame buffers (FB) from three reusable frame buffers in the system, and superimposes, on the idle FB, the layers contained in the DisplayList through an synthesis (compose) operation, according to application configuration information, such as which layer should be bottomed, which layer should be topped, which area should be visible, and which area should be transparent, etc., to obtain a final display frame (to-be-displayed image).

Finally, in a Kernel layer, the to-be-displayed image can be transmitted to a display hardware (including a display controller and a display screen), so that the to-be-displayed image is finally displayed on the display screen. Types of the display screen is not limited herein, which may be, for example, a liquid crystal display (LCD).

Figure 3:
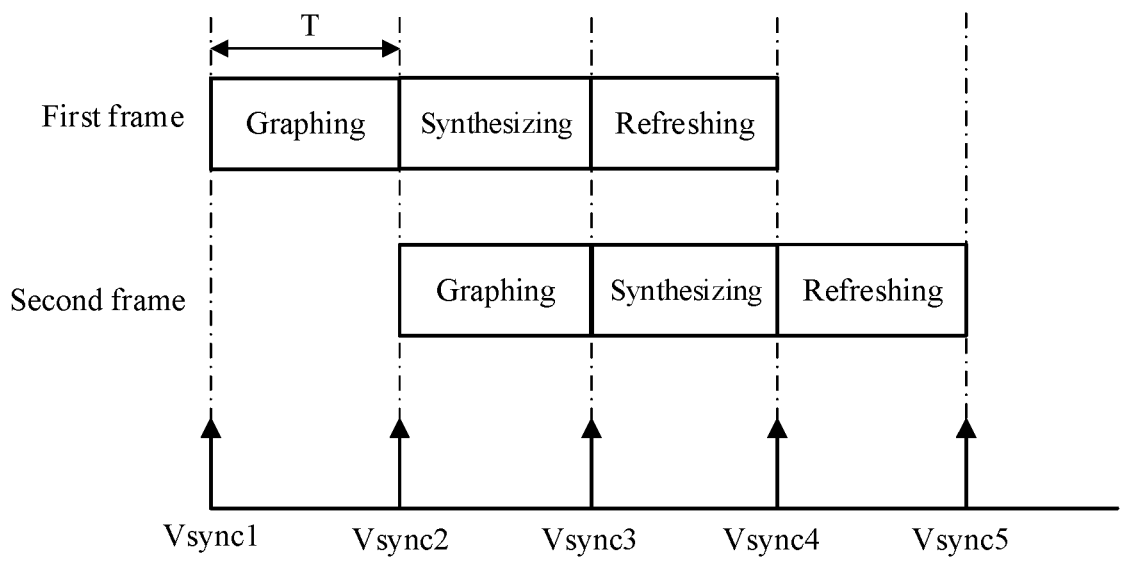
FIG. 3 is a schematic diagram of a Vsync display refresh mechanism according to an implementation of the present disclosure.

In addition, Android system introduces a synchronization (Vsync) refresh mechanism during the display refresh process. FIG. 3 is a schematic diagram of a Vsync display refresh mechanism according to an implementation of the present disclosure. Specifically, the Vsync display refresh mechanism actually is to insert a "heartbeat", that is, a system synchronization (Vsync) signal into an entire display process, and send the signal through the display controller to a central processing unit (CPU) for generating a Vsync interrupt, so as to control that each rendering operation and compose (or synthesis) operation needs to be done according to the heartbeat, so that key steps in the entire display process are incorporated into the unified management mechanism of the Vsync. At present, the frequency of the Vsync signal is usually 60 Hz.

As illustrated in FIG. 3, assuming that a period of the Vsync signal is T, without considering signal transmission delays, when a first Vsync signal Vsync1 reaches the CPU, the CPU forwards the first Vsync signal Vsync1 to each application, and each application starts the rendering operation in responds to user's touch sliding operation on the display screen. When each application completes the rendering operation, multiple layers rendered by each application are obtained. When a second Vsync signal Vsync2 reaches the CPU, the CPU forwards the second Vsync signal Vsync2 to the layer synthesizing module, and the layer synthesizing module starts to perform a layer synthesizing operation, and synthesizes the multiple layers rendered by each application to generate the to-be-displayed image.

When a third Vsync signal Vsync3 reaches the CPU, the system starts to perform a display refresh operation and finally displays the to-be-displayed image on the display screen.

The method for image graphing of the present disclosure mainly relates to the image graphing operation in the display process of the to-be-displayed image. The execution mode of the graphing operation may be a software mode, a hardware mode, or other modes. The software mode usually uses algorithms in the CPU of the mobile terminal device to achieve the graphing operation. The hardware mode usually uses special chips in a graphic processing unit (GPU) or a mobile display process (MDP) module of the mobile terminal device to implement the graphing operation.

When an image graphing event is triggered, for example, a touch sliding operation of a user acting on the display screen is received, the applications of the terminal may initiate the image graphing request, and wait for the response information of the image graphing request. That is, the action of initiating the image graphing request, and detecting the response information of the image graphing request may include the following.

Whether a touch sliding operation of the user acting on the display screen of the terminal is received is detected, when the image graphing event is triggered.

If the touch sliding operation acting on the display screen is received, the image graphing request based on the touch sliding operation is initiated.

The response information of the image graphing request is detected.

In some implementations, the response information of the image graphing request includes a Vsync signal sent by the CPU to the application.

At block 102, when the response information of the image graphing request is received, whether a target object meets a non-graphing condition is determined according to a preset image graphing strategy. If the target object meets the non-graphing condition, the action at block 103 is performed. If the target object does not meet the non-graphing condition, the action at block 104 is performed. The target object includes one of a current application and layers of the current application.

When the current application receives the Vsync signal for image graphing, whether the current application or the layers of the current application meets the graphing condition, that is, whether the graphing is required, is determined. Specifically, whether the target object meets the non-graphing condition may be determined according to a difference between a pixel value of a to-be-graphed image of the target object under the current Vsync signal and that of a previous graphed image corresponding to the target object. Alternatively, whether the target object meets the non-graphing condition may be determined according to the attribute of the target object. The application attribute of the application includes at least one of an application identifier, an application type, and an application priority. The layer attribute of the layer includes at least one of a layer identifier, a layer type, and a layer priority.

At block 103, the image graphing operation to the target object is skipped.

According to the technical solution provided in the present disclosure, by skipping the image graphing operation to the target object when the target object does not meet a graphing condition, therefore a frame rate of the to-be-graphed interface and the power consumption of the terminal can be reduced.

At block 104, the image graphing operation to the target object is performed.

According to the method for controlling image graphing of the terminal provided by the implementations, when the response information of the image graphing request is acquired by the current application, whether the target object meets the non-graphing condition is determined according to the preset image graphing strategy, where the target object includes one of the current application and the layers of the current application. If the target object meets the non-graphing condition, the image graphing operation to the target object is skipped, which can reduce a frame rate of the to-be-graphed interface and the power consumption of the terminal.

Figure 4:
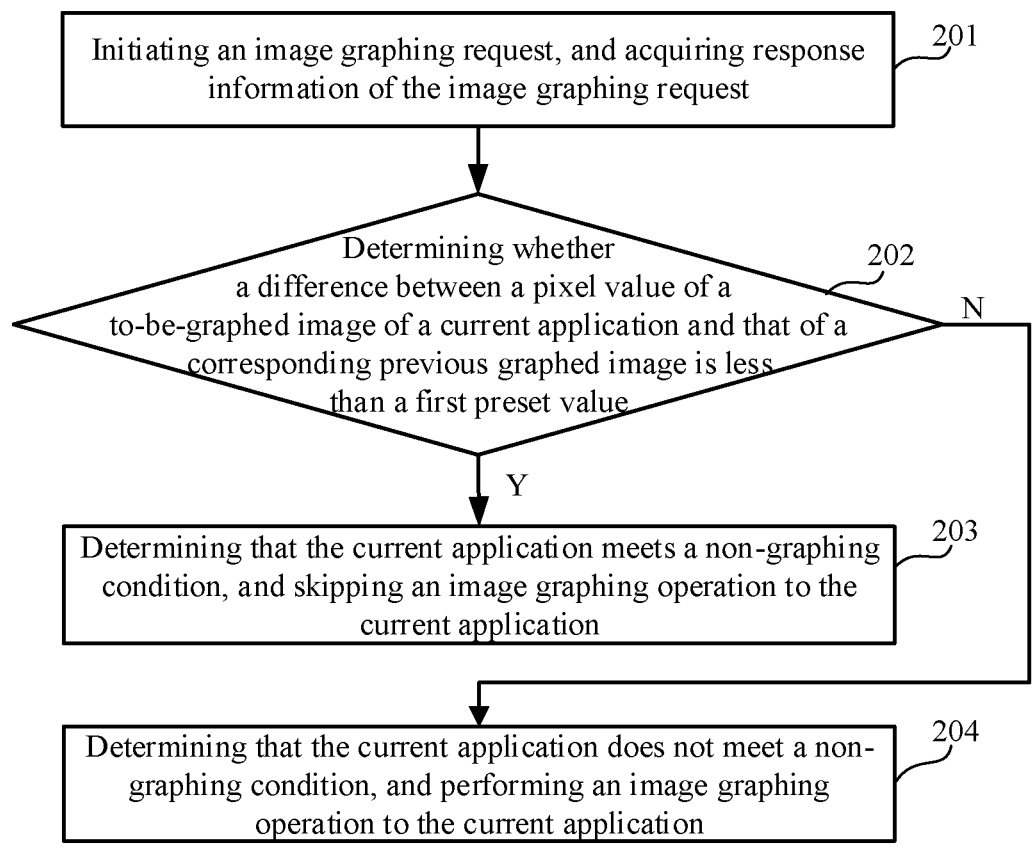
FIG. 4 is a flowchart of another method for controlling image graphing of a terminal according to an implementation of the present disclosure.

FIG. 4 is a flowchart of another method for controlling image graphing of a terminal according to an implementation of the present disclosure. The method provided in this implementation includes the following actions at blocks illustrated in FIG. 4.

At block 201, an image graphing request is initiated, and response information of the image graphing request is detected.

In the implementation, a current application initiates the image graphing request and detects the response information of the image graphing request.

At block 202, when the response information of the image graphing request is received, whether a difference between a pixel value of a to-be-graphed image of the current application and that of a previous graphed image corresponding to the current application is less than a first preset value is determined. If the difference is less than the first preset value, the action at block 203 is performed. If the difference is not less than the first preset value, the action at block 204 is performed.

In the implementation, the first preset value may be set according to specific requirements. If the current power reduction requirement of the terminal is not very large, for example, when the current power of the terminal is more than 50%, or the CPU runs at a lower frequency or has less load, the first preset value may be determined to be a smaller value. On the contrary, if the current power reduction requirement of the terminal is large, the first preset value may be determined to be a larger value.

At block 203, the current application is determined to meet a non-graphing condition, and an image graphing operation to the current application is skipped.

At block 204, the current application is determined not to meet the non-graphing condition, and the image graphing operation to the current application is performed.

In the implementation, when the current application is in a static interface scene, a low dynamic interface scene, or a high dynamic interface scene, when the current application detects that the difference between the pixel value of the to-be-graphed image of the current application and that of the previous graphed image corresponding to the current application is less than the first preset value, the current application is determined to meet the non-graphing condition, the graphing operation to the to-be-graphed image of the current application is skipped, and the corresponding previous graphed image may be sent to the layer synthesizing module for the synthesis operation, thereby reducing the power consumption of the CPU and/or GPU for performing the graphing operation in the terminal.

According to the method provided in this implementation, when the response information of the image graphing request is acquired by the current application, if the difference between the pixel value of the to-be-graphed image of the current application and that of the previous graphed image corresponding to the current application is less than the first preset value, the current application is determined to meet the non-graphing condition, and the image graphing operation to the current application is skipped, which can reduce a frame rate of the to-be-graphed interface and the power consumption of the terminal.

Figure 5:
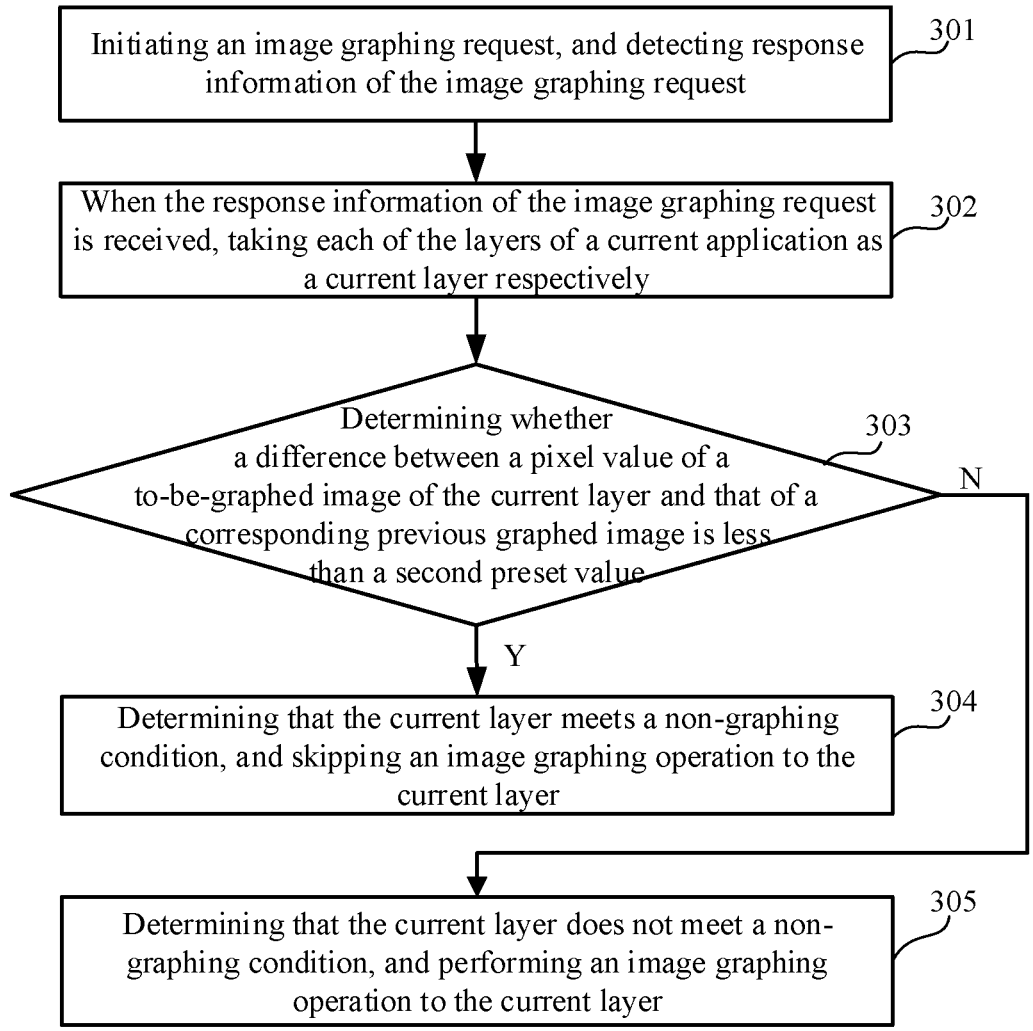
FIG. 5 is a flowchart of another method for controlling image graphing of a terminal according to an implementation of the present disclosure.

FIG. 5 is a flowchart of another method for controlling image graphing of a terminal according to an implementation of the present disclosure. The method for controlling image graphing of the terminal provided in this implementation includes the following actions at blocks illustrated in FIG. 5.

At block 301, an image graphing request is initiated, and response information of the image graphing request is detected.

In the implementation, a current application initiates the image graphing request and detects the response information of the image graphing request.

At block 302, when the response information of the image graphing request is received, each of the layers of the current application is taken as a current layer respectively.

At block 303, whether a difference between a pixel value of a to-be-graphed image of the current layer and that of a previous graphed image corresponding to the current layer is less than a second preset value is determined. If the difference is less than the second preset value, the action at block 203 is performed. If the difference is not less than the second preset value, the action at block 204 is performed.

In the implementation, the second preset value may be set according to specific requirements. If the current power reduction requirement of the terminal is not very large, for example, when the current power of the terminal is more than 50%, or the CPU runs at a lower frequency or has less load, the second preset value may be determined to be a smaller value. On the contrary, if the current power reduction requirement of the terminal is large, the second preset value may be determined to be a larger value.

At block 304, the current layer is determined to meet a non-graphing condition, and an image graphing operation to the current layer is skipped.

At block 305, the current layer is determined not to meet the non-graphing condition, and the image graphing operation to the current layer is performed.

In the implementation, when the current application is in a static interface scene, a low dynamic interface scene, or a high dynamic interface scene, when the current application detects that the difference between the pixel value of the to-be-graphed image of the current layer and that of the previous graphed image corresponding to the current layer is less than the second preset value, the current layer is determined to meet the non-graphing condition, the graphing operation to the to-be-graphed image of the current layer is skipped, and the corresponding previous graphed image may be sent to the layer synthesizing module for the synthesis operation, thereby reducing the power consumption of the CPU and/or GPU for performing the graphing operation in the terminal.

According to the method provided in this implementation, when the response information of the image graphing request is acquired by the current application, if the difference between the pixel value of the to-be-graphed image of the current layer and that of the corresponding previous graphed image is less than the second preset value, the current application is determined to meet the non-graphing condition, and the image graphing operation to the current layer is skipped, which can reduce a frame rate of the to-be-graphed interface and the power consumption of the terminal.

Figure 6:
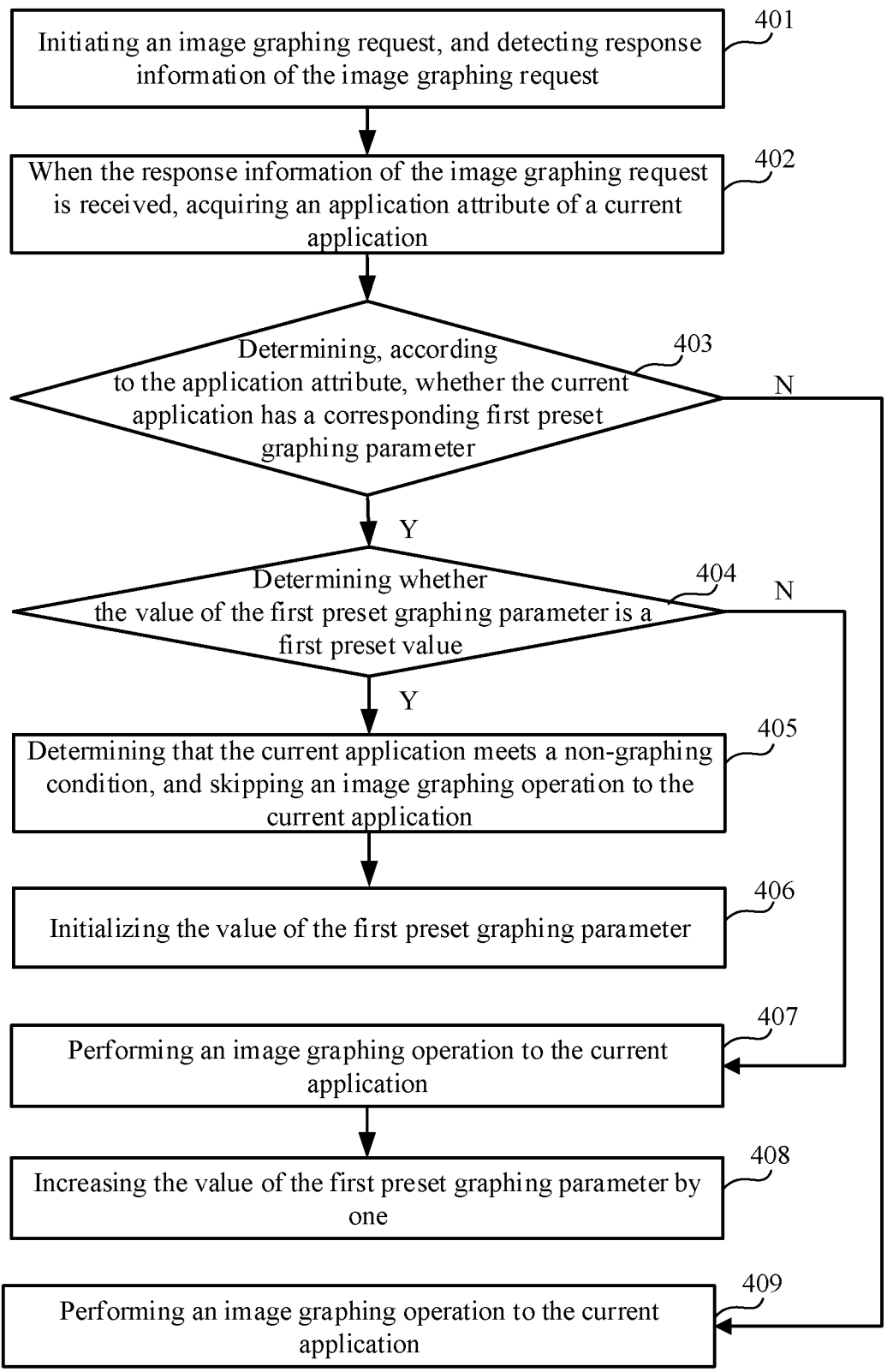
FIG. 6 is a flowchart of another method for controlling image graphing of a terminal according to an implementation of the present disclosure.

FIG. 6 is a schematic flowchart of another method for controlling image graphing of a terminal according to an implementation of the present disclosure. The method provided in this implementation includes the following actions at blocks illustrated in FIG. 6.

At block 401, an image graphing request is initiated, and response information of the image graphing request is detected.

In the implementation, a current application initiates the image graphing request and detects the response information of the image graphing request.

At block 402, when the response information of the image graphing request is received, an application attribute of the current application is acquired.

The application attribute includes at least one of an application identifier, an application type, and an application priority. The application identifier is an identity ID of the application. The types of the applications include at least one of a video type, a game type, a browser type, a reader type, and a software stewardship type.

At block 403, whether the current application has a corresponding first preset graphing parameter is determined according to the application attribute. If the current application has a corresponding first preset graphing parameter, the action at block 404 is performed. If the current application does not have a corresponding first preset graphing parameter, the action at block 409 is performed.

In the implementation, the initial value of the first preset graphing parameter is zero. After the application completes a graphing operation, the value of the first preset graphing parameter is increased by one, until the value of the first preset graphing parameter is the first preset value. It is possible to preset which type of applications have a corresponding first preset graphing parameter, for example, a reader type and a software stewardship type of applications. The application with lower priority may also be set to have a corresponding first preset graphing parameter, and the application with lower priority may be a software stewardship application, a reader application, etc.

At block 404, whether the value of the first preset graphing parameter is the first preset value is determined. If the value of the first preset graphing parameter is the first preset value, the action at block 405 is performed. If the value of the first preset graphing parameter isn't the first preset value, the action at block 407 is performed.

In the implementation, the first preset value may be set according to requirements, and the first preset value corresponding to the applications having different attributes may also be different. For example, the first preset value is two, that is, each time that the current application requires three images to be graphed, and one image graphing operation is not performed.

At block 405, the current application is determined to meet the non-graphing condition, and the image graphing operation to the current application is skipped.

At block 406, the value of the first preset graphing parameter is initialized.

In the implementation, when the value of the first graphing parameter corresponding to the current application is the first preset value, the current application is determined to meet the non-graphing condition, the graphing operation to the current to-be-graphed application of the current application is skipped, and the corresponding previous graphed image may be sent to the layer synthesizing module for the synthesis operation, thereby reducing the power consumption of the CPU and/or GPU for performing the graphing operation in the terminal.

At block 407, the image graphing operation to the current application is performed.

At block 408, the value of the first preset graphing parameter is increased by one.

At block 409, the image graphing operation to the current application is performed.

In the implementation, when the current application does not have a corresponding first preset graphing value, it is indicated that the current application does not meet the non-graphing condition, and the current image graphing operation is performed.

According to the method provided in this implementation, when the response information of the image graphing request is acquired by the current application, the application attribute of the current application is acquired. When the current application is determined, according to the application attribute, to have a corresponding first preset graphing parameter, and the value of the first preset graphing parameter is the first preset value, it is determined that the current application meets the non-graphing condition, and the image graphing operation to the current application is skipped, so that a frame rate of the to-be-graphed interface and the power consumption of the terminal can be reduced.

Figure 7:
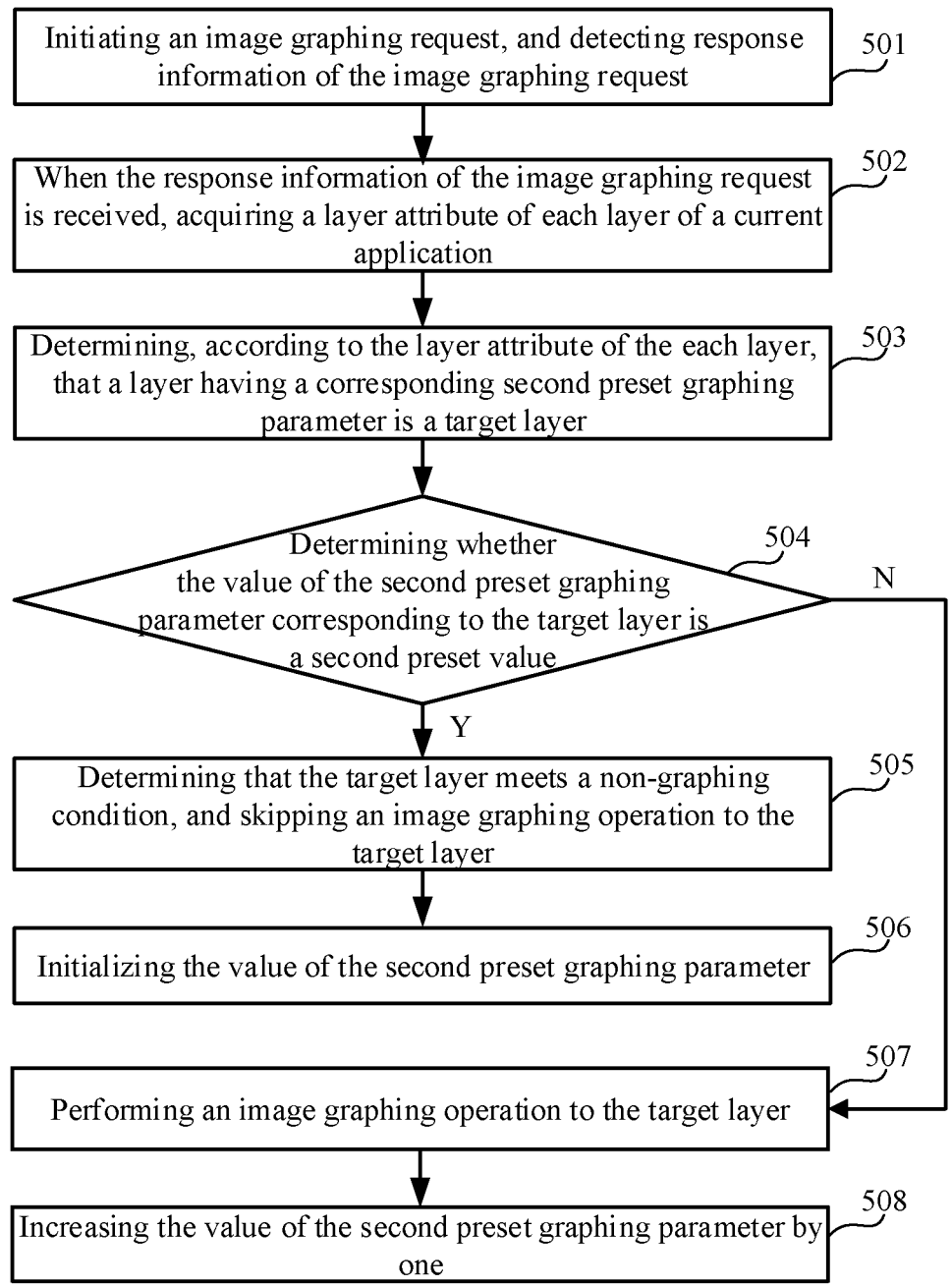
FIG. 7 is a flowchart of another method for controlling image graphing of a terminal according to an implementation of the present disclosure.

FIG. 7 is a flowchart of another method for controlling image graphing of a terminal according to an implementation of the present disclosure. The method provided in this implementation includes the following actions at blocks illustrated in FIG. 7.

At block 501, an image graphing request is initiated, and response information of the image graphing request is detected.

In the implementation, a current application initiates the image graphing request and detects the response information of the image graphing request.

At block 502, when the response information of the image graphing request is received, a layer attribute of each layer of the current application is acquired.

The layer attribute includes at least one of a layer identifier, a layer type, and a layer priority. The layer identifier is an identity ID of the layer. Each application may include multiple layers. For example, a video application includes a video screen layer for displaying video content, a UI layer for displaying user interface controls (pause keys, playback progress bars, fast-forward keys, etc.) or advertisements, and a barrage layer for displaying barrage contents. The types of the layers include at least one of a video screen type, an advertisement type, a barrage type, and a background type.

At block 503, a layer having a corresponding second preset graphing parameter is determined to be a target layer according to the layer attribute of the each layer.

In the implementation, the initial value of the second preset graphing parameter is zero. After the layer is triggered by the application for a rendering operation, the value of the second preset graphing parameter is increased by one, until the value of the second preset graphing parameter is the second preset value. It is possible to preset which types of layers have a corresponding second preset graphing parameter, for example, the advertisement type and the background type of layers. The layer with lower priority may also be set to have a corresponding second preset graphing parameter, and the layer with lower priority may include an advertisement layer, a background layer, etc.

At block 504, whether the value of the second preset graphing parameter corresponding to the target layer is the second preset value is determined. If the value of the second preset graphing parameter is the second preset value, the action at block 505 is performed. If the value of the second preset graphing parameter isn't the second preset value, the action at block 507 is performed.

In the implementation, the second preset value may be set according to requirements, and the second preset value corresponding to the layer having different attributes may also be different. For example, the second preset value is two, that is, each time that the current layer is triggered to be drawn with three images, one image drawing operation is not performed.

At block 505, the target layer is determined to meet the non-graphing condition, and the image graphing operation to the target layer is skipped.

At block 506, the value of the second preset graphing parameter is initialized.

At block 507, the image graphing operation to the target layer is performed.

At block 508, the value of the second preset graphing parameter is increased by one.

In the implementation, when current application is determined to meet the non-graphing condition, by skipping the graphing operation of this time to the to-be-graphed image of the target layer, the power consumption of the CPU and/or GPU for performing the graphing operation in the terminal is reduced.

According to the method provided in this implementation, when the response information of the image graphing request is acquired by the current application, the layer attribute of each layer of the current application is acquired, and the layer having the corresponding second preset graphing parameter is determined to be the target layer. When the value of the second preset graphing parameter is the second preset value, the target layer is determined to meet the non-graphing condition, and the image graphing operation to the target layer is skipped, thereby reducing a frame rate of the to-be-graphed interface and the power consumption of the terminal.

According to an implementation of the present disclosure, an apparatus for controlling image graphing of a terminal is provided. The apparatus includes the following.

A detecting module is configured to initiate an image graphing request, and detect response information of the image graphing request.

A determining module is configured to determine, according to a preset image graphing strategy, whether a target object meets a non-graphing condition, when the response information of the image graphing request is received, where the target object includes one of a current application and layers of the current application.

A skipping module is configured to skip an image graphing operation to the target object in response to a determination that the target object meets the non-graphing condition.

In some implementations, the target object is the current application. The determining module is configured to: determine a difference between a pixel value of a to-be-graphed image of the current application and that of a previous graphed image corresponding to the current application; and determine that the current application meets the non-graphing condition, in response to a determination that the difference is less than a first preset value.

The skipping module is configured to skip the image graphing operation to the current application.

In some implementations, the target object is each of the layers of the current application. The determining module is configured to: take each of the layers as a current layer respectively; determine a difference between a pixel value of a to-be-graphed image of the current layer and that of a previous graphed image corresponding to the current layer; and determine that the current layer meets the non-graphing condition, in response to a determination that the difference is less than a second preset value.

The skipping module is configured to skip the image graphing operation to the current layer.

In some implementations, the target object is the current application. The determining module is configured to: acquire an application attribute of the current application, and determine, according to the application attribute, whether the current application has a corresponding first preset graphing parameter, where the application attribute includes at least one of an application identifier, an application type, and an application priority; and determine that the current application meet the non-graphing condition, in response to a determination that the current application has the corresponding first preset graphing parameter and the value of the first preset graphing parameter is a first preset value.

The skipping module is configured to skip the image graphing operation to the current application.

In some implementations, the determining module is further configured to initialize the value of the second preset graphing parameter, in response to the determination that the value of the second preset graphing parameter is the second preset value.

In some implementations, the determining module is further configured to increase the value of the second preset graphing parameter by one, in response to a determination that the value of the second preset graphing parameter isn't the second preset value.

In some implementations, the target object is each of the layers of the current application. The determining module is configured to: acquire a layer attribute of each layer of the current application, and determine, according to the layer attribute of the each layer, that a layer having a corresponding second preset graphing parameter is a target layer, where the layer attribute includes at least one of a layer identifier, a layer type, and a layer priority; and determine that the target layer meets the non-graphing condition, in response to a determination that the value of the second preset graphing parameter corresponding to the target layer is a second preset value.

The skipping module is configured to skip the image graphing operation to the target layer.

In some implementations, the determining module is further configured to initialize the value of the second preset graphing parameter, in response to the determination that the value of the second preset graphing parameter is the second preset value.

In some implementations, the determining module is further configured to increase the value of the second preset graphing parameter by one, in response to a determination that the value of the second preset graphing parameter isn't the second preset value.

Figure 8:
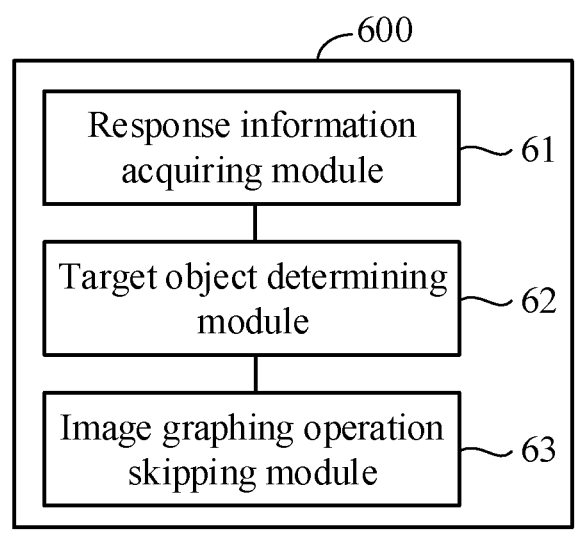
FIG. 8 is a schematic structural diagram of an apparatus for controlling image graphing of a terminal according to an implementation of the present disclosure.

FIG. 8 is a schematic structural diagram of an apparatus for controlling image graphing of a terminal according to an implementation of the present disclosure. The apparatus may be implemented by software and/or hardware and integrated in the terminal. As illustrated in FIG. 8, the apparatus 600 includes a detecting module 61, a determining module 62, and a skipping module 63. In the implementation, the functions of the detecting module 61, the determining module 62, and the skipping module 63 may be implemented by a processor.

The detecting module 61 is configured to initiate an image graphing request, and detect response information of the image graphing request.

The determining module 62 is configured to determine, according to a preset image graphing strategy, whether a target object meets a non-graphing condition, when the response information of the image graphing request is received, where the target object includes one of a current application and layers of the current application.

The skipping module 63 is configured to skip an image graphing operation to the target object if the target object meets the non-graphing condition.

In some implementations, the target object is the current application. The determining module 62 is configured to: determine a difference between a pixel value of a to-be-graphed image of the current application and that of a previous graphed image corresponding to the current application; and determine that the current application meets the non-graphing condition, if the difference is less than a first preset value.

The skipping module 63 is configured to skip the image graphing operation to the current application.

In some implementations, the target object is each of the layers of the current application. The determining module 62 is configured to: take each of the layers as a current layer respectively; determine a difference between a pixel value of a to-be-graphed image of the current layer and that of a previous graphed image corresponding to the current layer; and determine that the current layer meets the non-graphing condition, if the difference is less than a second preset value.

The skipping module 63 is configured to skip the image graphing operation to the current layer.

In some implementations, the target object is the current application. The determining module 62 is configured to: acquire an application attribute of the current application, and determine, according to the application attribute, whether the current application has a corresponding first preset graphing parameter, where the application attribute includes at least one of an application identifier, an application type, and an application priority; and determine that the current application meet the non-graphing condition, when the current application has the corresponding first preset graphing parameter and the value of the first preset graphing parameter is a first preset value.

The skipping module 63 is configured to skip the image graphing operation to the current application.

In some implementations, the determining module 62 is further configured to initialize the value of the second preset graphing parameter, in response to the determination that the value of the second preset graphing parameter is the second preset value.

In some implementations, the determining module 62 is further configured to increase the value of the second preset graphing parameter by one, in response to a determination that the value of the second preset graphing parameter isn't the second preset value.

In some implementations, the target object is each of the layers of the current application. The determining module 62 is configured to: acquire a layer attribute of each layer of the current application, and determine, according to the layer attribute of the each layer, that a layer having a corresponding second preset graphing parameter is a target layer, where the layer attribute includes at least one of a layer identifier, a layer type, and a layer priority; and determine that the target layer meets the non-graphing condition, when the value of the second preset graphing parameter corresponding to the target layer is a second preset value.

The skipping module 63 is configured to skip the image graphing operation to the target layer.

In some implementations, the determining module 62 is further configured to initialize the value of the second preset graphing parameter, in response to the determination that the value of the second preset graphing parameter is the second preset value.

In some implementations, the determining module 62 is further configured to increase the value of the second preset graphing parameter by one, in response to a determination that the value of the second preset graphing parameter isn't the second preset value.

According to the apparatus provided in the implementations, when the response information of the image graphing request is acquired by the current application, whether the target object meets the non-graphing condition is determined according to the preset image graphing strategy, where the target object includes one of the current application and the layers of the current application. If the target object meets the non-graphing condition, the image graphing operation to the target object is skipped, which can reduce a frame rate of the to-be-graphed interface and the power consumption of the terminal.

Figure 9:
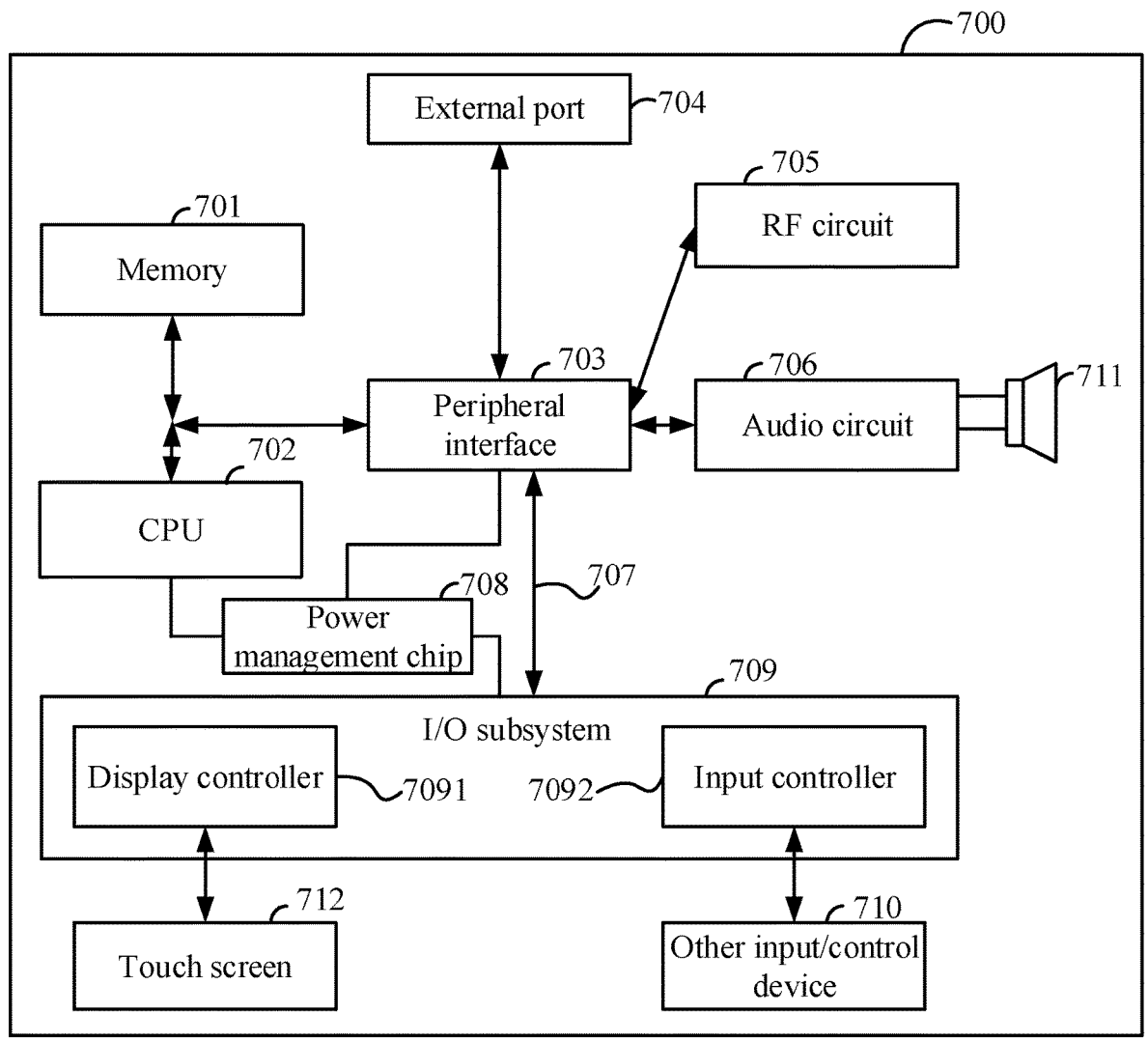
FIG. 9 is a schematic structural diagram of a terminal according to an implementation of the present disclosure.

According to an implementation of the present disclosure, a terminal is further provided, which may be a mobile terminal such as a smart phone, a tablet computer, etc. FIG. 9 is a schematic structural diagram of a terminal according to an implementation of the present disclosure. The terminal may include the apparatus for controlling image graphing of the terminal according to any implementation of the present disclosure. As illustrated in FIG. 9, the terminal 700 may include a memory 701, and at least one central processing unit (also referred to as a processor, hereinafter referred to as a CPU) 702. The memory 701 is configured to store executable program codes. The processor 702 runs computer programs corresponding to the executable program codes by reading the executable program codes stored in the memory 701 to perform the following.

An image graphing request is initiated, and response information of the image graphing request is detected. When the response information of the image graphing request is received, whether a target object meets a non-graphing condition is determined according to a preset image graphing strategy, where the target object includes one of a current application and layers of the current application. If the target object meets the non-graphing condition, an image graphing operation to the target object is skipped.

In some implementations, the target object is the current application. The computer programs further cause the processor to carry out the following actions: determining a difference between a pixel value of a to-be-graphed image of the current application and that of a previous graphed image corresponding to the current application; and determining that the current application meets the non-graphing condition, if the difference is less than a first preset value; and skipping the image graphing operation to the current application.

In some implementations, the target object is each of the layers of the current application. The computer programs further cause the processor to carry out the following actions: taking each of the layers as a current layer respectively; determining a difference between a pixel value of a to-be-graphed image of the current layer and that of a previous graphed image corresponding to the current layer;

and determining that the current layer meets the non-graphing condition, if the difference is less than a second preset value; and skipping the image graphing operation to the current layer.

In some implementations, the target object is the current application. The computer programs further cause the processor to carry out the following actions: acquiring an application attribute of the current application, and determining, according to the application attribute, whether the current application has a corresponding first preset graphing parameter, where the application attribute includes at least one of an application identifier, an application type, and an application priority; determining that the current application meets the non-graphing condition, when the current application has the corresponding first preset graphing parameter and the value of the first preset graphing parameter is a first preset value; and skipping the image graphing operation to the current application.

In some implementations, the computer programs further cause the processor to carry out one of the following actions: initializing the value of the first preset graphing parameter, in response to the determination that the current application has the corresponding first preset graphing parameter and the value of the first preset graphing parameter is the first preset value; and increasing the value of the first preset graphing parameter by one, in response to a determination that the current application has the corresponding first preset graphing parameter but the value of the first preset graphing parameter isn't the first preset value.

In some implementations, the target object is each of the layers of the current application. The computer programs further cause the processor to carry out the following actions: acquiring a layer attribute of each layer of the current application, and determining, according to the layer attribute of the each layer, that a layer having a corresponding second preset graphing parameter is a target layer, where the layer attribute includes at least one of a layer identifier, a layer type, and a layer priority; determining that the target layer meets the non-graphing condition, in response to a determination that the value of the second preset graphing parameter corresponding to the target layer is a second preset value; and skipping the image graphing operation to the target layer.

In some implementations, the computer programs further cause the processor to carry out one of the following actions: initializing the value of the second preset graphing parameter, in response to the determination that the value of the second preset graphing parameter is the second preset value; and increasing the value of the second preset graphing parameter by one, in response to a determination that the value of the second preset graphing parameter isn't the second preset value.

In some implementations, the computer programs further cause the processor to carry out the following actions: detecting whether a touch sliding operation of a user acting on a display screen of the terminal is received, when an image graphing event is triggered; initiating the image graphing request based on the touch sliding operation if the touch sliding operation acting on the display screen is received; and detecting the response information of the image graphing request.

In some implementations, the computer programs further cause the processor to carry out the following actions: performing the image graphing operation to the target object if the target object does not meet the non-graphing condition.

The terminal 700 further includes a peripheral interface 703, a radio frequency (RF) circuit 705, an audio circuit 706, a speaker 711, a power management chip 708, an input/output (I/O) subsystem 709, a touch screen 712, other input/control devices 710, and an external port 704. These components communicate with each other via one or more communication buses or signal lines 707.

It should be understood that the illustrated terminal 700 is merely an example of the terminal. The terminal 700 may have more or fewer components than those illustrated in the figures, and may combine two or more components, or it may have different component configurations. The various components illustrated in the figures may be implemented in hardware, software, or a combination of hardware and software, including one or more signal processing and/or application specific integrated circuits.

The terminal for controlling image graphing provided by the present implementation is described in detail below. The terminal takes a mobile phone as an example.

The memory 701 can be accessed by the CPU 702, the peripheral interface 703, etc. The memory 701 may include a high-speed random access memory, and may also include a non-volatile memory, such as one or more magnetic disk storage devices, flash memory devices, or other volatile solid-state storage devices.

The peripheral interface 703 may connect input and output peripherals of the device to the CPU 702 and the memory 701.

The I/O subsystem 709 may connect the input and output peripherals of the device, such as the touch screen 712 and the other input/control devices 710, to the peripheral interface 703. The I/O subsystem 709 may include a display controller 7091 and one or more input controllers 7092 for controlling the other input/control devices 710. The one or more input controllers 7092 receive electrical signals from the other input/control devices 710 or transmit electrical signals to the other input/control devices 710. The other input/control devices 710 may include physical buttons (such as press buttons, rocker buttons, etc.), dials, slide switches, joysticks, click wheels, etc. It is worth noting that the input controller 7092 may be connected to any of the following: a keyboard, an infrared port, a USB interface, and a pointing device such as a mouse.

The touch screen 712 is an input and output interface between a user terminal and a user, and displays the visual output to the user. The visual output may include graphics, text, icons, videos, etc.

The display controller 7091 in the I/O subsystem 709 receives electrical signals from the touch screen 712 or transmits electrical signals to the touch screen 712. The touch screen 712 detects contact on the touch screen, and the display controller 7091 converts the detected contact into interaction with a user interface object displayed on the touch screen 712, that is, to realize human-computer interaction. The user interface object displayed on the touch screen 712 may be icons for running games, icons for networking to corresponding networks, etc. It is worth noting that the device may also include a photomouse, which is a touch sensitive surface that does not display visual output, or an extension of a touch sensitive surface formed by the touch screen.

The RF circuit 705 is mainly used for establishing communication between the mobile phone and wireless network (ie, network side) to realize data reception and transmission between the mobile phone and the wireless network. For example, sending and receiving short messages, e-mails, etc. Specifically, the RF circuit 705 receives and transmits an RF signal, which is also referred to as an electromagnetic signal. The RF circuit 705 converts an electrical signal into an electromagnetic signal or converts an electromagnetic signal into an electrical signal, and communicates with a communication network and other devices through the electromagnetic signal. The RF circuitry 705 may include known circuits for performing these functions, including but not limited to an antenna system, an RF transceiver, one or more amplifiers, a tuner, one or more oscillators, a digital signal processor, a coder-decoder (CODEC) chipset, a subscriber identity module (SIM), etc.

The audio circuit 706 is mainly configured to receive audio data from the peripheral interface 703, convert the audio data into an electrical signal, and transmit the electrical signal to the speaker 711.

The speaker 711 is configured to restore a voice signal received by the mobile phone from the wireless network through the RF circuit 705 to sound, and play the sound to the user.

The power management chip 708 is configured for power supply and power management of the hardware connected to the CPU 702, the I/O subsystem 709, and the peripheral interface 703.

The terminal may execute the method provided by any implementation of the present disclosure, and have function modules corresponding to the execution method. When the current application acquires the response information of the image graphing request, by determining whether the target object meets the non-graphing condition according to the set image graphing strategy, where the target object includes a current application or layers of the current application, and skipping the image graphing operation to the target object if the target object meets the non-graphing condition, a frame rate of the to-be-graphed interface and the power consumption of the terminal may be reduced.

The implementation of the present disclosure further provides a non-transitory computer readable storage medium, on which computer programs are stored. The computer programs are executed by a processor to perform the method for controlling image graphing of the terminal described in the foregoing implementations of the present disclosure. It should be noted that the specific implementation process of the present implementations may be referred to the specific implementation process described in the foregoing method implementations, and is not described herein.

It can be understood by those of ordinary skill in the art that all or part of the steps of the various methods of the foregoing implementations may be accomplished by means of a program to instruct associated hardware. The program may be stored in a computer-readable medium which may include a read-only memory (ROM), a random-access memory (RAM), a disk or compact disc (CD), etc.

The above are only the preferred implementations of the present disclosure and the technical principles applied thereto. The present disclosure is not limited to the specific implementations described herein. Various obvious changes, readjustments and substitutions that can be made by those skilled in the art will not depart from the scope of the disclosure. Therefore, although the present disclosure has been described in detail by the above implementations, the present disclosure is not limited to the above implementations, but may include more equivalent implementations without departing from the concept of the present disclosure. The scope of the present disclosure is determined by the scope of the claims.

What is claimed is:

1. A method for controlling image graphing of a terminal, comprising:
    initiating an image graphing request, and detecting response information of the image graphing request, wherein the response information comprises a synchronization (Vsync) signal generated by a Vsync display refresh mechanism, and the Vsync signal is sent from a CPU of the terminal to a current application, wherein the Vsync display refresh mechanism is to insert the Vsync signal into an entire display process and send the Vsync signal to the CPU for generating a Vsync interrupt to control each rendering operation and synthesis operation to be done according to the Vsync signal;
    determining, according to a preset image graphing strategy, whether a target object meets a non-graphing condition, when the response information of the image graphing request is received, wherein the target object comprises one of the current application and layers of the current application; and
    skipping an image graphing operation to the target object in response to a determination that the target object meets the non-graphing condition, and performing the synthesis operation based on a corresponding previous graphed image.

2. The method of claim 1, wherein the target object is the current application;
    wherein determining, according to the preset image graphing strategy, whether the target object meets the non-graphing condition comprises:
        determining a difference between a pixel value of a to-be-graphed image of the current application and that of a previous graphed image corresponding to the current application; and
        determining that the current application meets the non-graphing condition, in response to a determination that the difference is less than a first preset value; and
    wherein skipping the image graphing operation to the target object comprises:
        skipping the image graphing operation to the current application.

3. The method of claim 1, wherein the target object is each of the layers of the current application;
    wherein determining, according to the preset image graphing strategy, whether the target object meets the non-graphing condition comprises:
        taking each of the layers as a current layer respectively;
        determining a difference between a pixel value of a to-be-graphed image of the current layer and that of a previous graphed image corresponding to the current layer; and
        determining that the current layer meets the non-graphing condition, in response to a determination that the difference is less than a second preset value; and
    wherein skipping the image graphing operation to the target object comprises:
        skipping the image graphing operation to the current layer.

4. The method of claim 1, wherein the target object is the current application;
    wherein determining, according to the preset image graphing strategy, whether the target object meets the non-graphing condition comprises:
        acquiring an application attribute of the current application, and determining, according to the application attribute, whether the current application has a corresponding first preset graphing parameter, wherein the application attribute comprises at least one of an application identifier, an application type, and an application priority; and determining that the current application meets the non-graphing condition, in response to a determination that the current application has the corresponding first preset graphing parameter and the value of the first preset graphing parameter is a first preset value; and wherein skipping the image graphing operation to the target object comprises:
skipping the image graphing operation to the current application.

5. The method of claim 4, further comprising:
initializing the value of the first preset graphing parameter, in response to the determination that the current application has the corresponding first preset graphing parameter and the value of the first preset graphing parameter is the first preset value; or
increasing the value of the first preset graphing parameter by one, in response to a determination that the current application has the corresponding first preset graphing parameter but the value of the first preset graphing parameter isn't the first preset value.

6. The method of claim 1, wherein the target object is each of the layers of the current application;
wherein determining, according to the preset image graphing strategy, whether the target object meets the non-graphing condition comprises:
acquiring a layer attribute of each layer of the current application, and determining, according to the layer attribute of the each layer, that a layer having a corresponding second preset graphing parameter is a target layer, wherein the layer attribute comprises at least one of a layer identifier, a layer type, and a layer priority; and
determining that the target layer meets the non-graphing condition, in response to a determination that the value of the second preset graphing parameter corresponding to the target layer is a second preset value; and
wherein skipping the image graphing operation to the target object comprises:
skipping the image graphing operation to the target layer.

7. The method of claim 6, further comprising:
initializing the value of the second preset graphing parameter, in response to the determination that the value of the second preset graphing parameter is the second preset value; or
increasing the value of the second preset graphing parameter by one, in response to a determination that the value of the second preset graphing parameter isn't the second preset value.

8. The method of claim 1, further comprising:
performing the image graphing operation to the target object in response to a determination that the target object does not meet the non-graphing condition.

9. The method of claim 1, wherein initiating the image graphing request, and detecting the response information of the image graphing request comprises:
detecting whether a touch sliding operation of a user acting on a display screen of the terminal is received, when an image graphing event is triggered;
initiating the image graphing request based on the touch sliding operation in response to a determination that the touch sliding operation acting on the display screen is received; and
detecting the response information of the image graphing request.

10. The method of claim 1, wherein performing the synthesis operation based on a corresponding previous graphed image comprises:
sending a corresponding previous graphed image to a layer synthesizing module; and
performing a synthesis operation based on the corresponding previous graphed image in the layer synthesizing module, wherein the layer synthesizing module selects visible layers from all layers, finds an idle frame buffer, and superimposes the selected layers on the idle frame buffer through the synthesis operation according to application configuration information.

11. A non-transitory computer-readable storage medium storing computer programs which, when executed by a processor, cause the processor to:
initiate an image graphing request, and detect response information of the image graphing request, wherein the response information comprises a Vsync signal generated by a Vsync display refresh mechanism, and the Vsync signal is sent from a CPU of the terminal to a current application, wherein the Vsync display refresh mechanism is to insert the Vsync signal into an entire display process and send the Vsync signal to the CPU for generating a Vsync interrupt to control each rendering operation and synthesis operation to be done according to the Vsync signal;
determine, according to a preset image graphing strategy, whether a target object meets a non-graphing condition, when the response information of the image graphing request is received, wherein the target object comprises one of the current application and layers of the current application; and
skip an image graphing operation to the target object in response to a determination that the target object meets the non-graphing condition, and perform the synthesis operation based on a corresponding previous graphed image.

12. The non-transitory computer-readable storage medium of claim 11, wherein the computer programs further cause the processor to:
perform the image graphing operation to the target object in response to a determination that the target object does not meet the non-graphing condition.

13. A terminal comprising:
at least one processor; and
a memory, coupled to the at least one processor and storing computer programs thereon, which when executed by the processor, cause the processor to carry out the following actions:
initiating an image graphing request, and detecting response information of the image graphing request, wherein the response information comprises a Vsync signal generated by a Vsync display refresh mechanism, and the Vsync signal is sent from a CPU of the terminal to a current application, wherein the Vsync display refresh mechanism is to insert the Vsync signal into an entire display process and send the Vsync signal to the CPU for generating a Vsync interrupt to control each rendering operation and synthesis operation to be done according to the Vsync signal;

determining, according to a preset image graphing strategy, whether a target object meets a non-graphing condition, when the response information of the image graphing request is received, wherein the target object comprises one of the current application and layers of the current application; and skipping an image graphing operation to the target object in response to a determination that the target object meets the non-graphing condition, and performing the synthesis operation based on a corresponding previous graphed image.

14. The terminal of claim 13, wherein the target object is the current application; and the computer programs further cause the processor to carry out the following actions, comprising:
determining a difference between a pixel value of a to-be-graphed image of the current application and that of a previous graphed image corresponding to the current application;
determining that the current application meets the non-graphing condition, in response to a determination that the difference is less than a first preset value; and
skipping the image graphing operation to the current application.

15. The terminal of claim 13, wherein the target object is each of the layers of the current application; and the computer programs further cause the processor to carry out the following actions, comprising:
taking each of the layers as a current layer respectively;
determining a difference between a pixel value of a to-be-graphed image of the current layer and that of a previous graphed image corresponding to the current layer;
determining that the current layer meets the non-graphing condition, in response to a determination that the difference is less than a second preset value; and
skipping the image graphing operation to the current layer.

16. The terminal of claim 13, wherein the target object is the current application; and the computer programs further cause the processor to carry out the following actions, comprising:
acquiring an application attribute of the current application, and determining, according to the application attribute, whether the current application has a corresponding first preset graphing parameter, wherein the application attribute comprises at least one of an application identifier, an application type, and an application priority;
determining that the current application meets the non-graphing condition and initializing the value of the first preset graphing parameter, in response to a determination that the current application has the corresponding first preset graphing parameter and the value of the first preset graphing parameter is a first preset value; and
skipping the image graphing operation to the current application.

17. The terminal of claim 16, wherein the computer programs further cause the processor to carry out the following actions, comprising:
initializing the value of the first preset graphing parameter, in response to the determination that the current application has the corresponding first preset graphing parameter and the value of the first preset graphing parameter is the first preset value; or
increasing the value of the first preset graphing parameter by one, in response to a determination that the current application has the corresponding first preset graphing parameter but the value of the first preset graphing parameter isn't the first preset value.

18. The terminal of claim 13, wherein the target object is each of the layers of the current application; and the computer programs further cause the processor to carry out the following actions, comprising:
acquiring a layer attribute of each layer of the current application, and determining, according to the layer attribute of the each layer, that a layer having a corresponding second preset graphing parameter is a target layer, wherein the layer attribute comprises at least one of a layer identifier, a layer type, and a layer priority;
determining that the target layer meets the non-graphing condition and initializing the value of the second preset graphing parameter, in response to a determination that the value of the second preset graphing parameter corresponding to the target layer is a second preset value; and
skipping the image graphing operation to the target layer.

19. The terminal of claim 18, wherein the computer programs further cause the processor to carry out the following actions, comprising:
initializing the value of the second preset graphing parameter, in response to the determination that the value of the second preset graphing parameter is the second preset value; or
increasing the value of the second preset graphing parameter by one, in response to a determination that the value of the second preset graphing parameter isn't the second preset value.

20. The terminal of claim 13, wherein the computer programs further cause the processor to carry out the following actions, comprising:
detecting whether a touch sliding operation of a user acting on a display screen of the terminal is received, when an image graphing event is triggered;
initiating the image graphing request based on the touch sliding operation in response to a determination that the touch sliding operation acting on the display screen is received; and
detecting the response information of the image graphing request.

* * * * *